United States Patent [19]

Morisawa et al.

[11] Patent Number: 4,611,243

[45] Date of Patent: Sep. 9, 1986

[54] ELECTRONIC CAMERA HAVING IMPROVED SUPPORT FOR OPTICAL LOW-PASS FILTER

[75] Inventors: Tahei Morisawa; Harumi Aoki, both of Tokyo, Japan

[73] Assignee: Asahi Kogaku Kogyo K.K., Tokyo, Japan

[21] Appl. No.: 605,546

[22] Filed: Apr. 30, 1984

[30] Foreign Application Priority Data

Apr. 30, 1983 [JP] Japan ................ 58-76473

[51] Int. Cl.⁴ .............................................. H04N 5/30
[52] U.S. Cl. ...................... 358/225; 358/229; 354/152; 350/318
[58] Field of Search ............... 358/225, 229; 350/318; 354/288, 152

[56] References Cited

U.S. PATENT DOCUMENTS 3,804,532  4/1974  Patten ........................ 350/318
3,978,497  8/1976  Kondo ........................ 354/152

FOREIGN PATENT DOCUMENTS 58-70686  4/1983  Japan ........................ 358/225
58-75974  5/1983  Japan ........................ 358/225

*Primary Examiner*—Gene Z. Rubinson
*Assistant Examiner*—L. Schroeder
*Attorney, Agent, or Firm*—Sughrue, Mion, Zinn, Macpeak & Seas

[57] ABSTRACT

An electronic camera of a type employing an optical low-pass filter to eliminate moire pattern effects wherein the overall size of the camera is reduced and an optimum shutter efficiency is obtained. The camera includes, in order, an objective lens, a retractable mirror, a focal plane shutter, and an image pickup device. The optical low-pass filter is positioned between the retractable mirror and the focal plane shutter. The arrangement avoids interference with the path of the retractable mirror and prevents an increase in the distance between the focal length shutter and the image pickup device.

2 Claims, 4 Drawing Figures

ELECTRONIC CAMERA HAVING IMPROVED SUPPORT FOR OPTICAL LOW-PASS FILTER

BACKGROUND OF THE INVENTION

The present invention pertains to an electronic camera, particularly, to an electronic camera of a type employing an optical low-pass filter and a focal plane shutter. More specifically, the invention pertains to such an electronic camera having an improved mounting arrangement for the optical low-pass filter.

In an electronic camera, an image-bearing optical signal is focused by an objective lens onto an image pickup device which converts the optical signal into an electrical signal which can be stored on a storage medium such as a magnetic tape, magnetic disk or semiconductor memory. This type of camera is advantageous over an ordinary camera which requires the use of film since no chemical processing of any type is required.

The image pickup device used to convert the optical signal into an electrical signal is an array of individual pixels (picture elements). Two primary types of such pickup devices are known, the MOS type and the CCD type. In either case, there is unavoidably some small gap between adjacent ones of the pixels. Hence, if the image being viewed contains spatial frequencies higher than the density of pixels (the number of pixels per unit distance), moire pattern interference results. In order to eliminate such interference, it has been the practice to provide an optical low-pass filter in the path of the image bearing optical signal to eliminate the unwanted high spatial frequency component from the optical signal. A crystal plate and a phase filter are suitable for this purpose.

To control the amount of exposure in an electronic camera, it has been the usual case to employ a focal plane shutter of the same type typically used in film-type single lens reflex cameras. In such a case, a problem arises regarding the placement of the optical filter. Two arrangements have been previously employed: one where the optical filter is positioned between the rear of the objective lens and the image reflecting mirror, and the other where the optical filter is positioned between the focal plane shutter and the image pickup device. However, the former arrangement is disadvantageous in that it is necessary to provide space for the image reflecting mirror to move out of the optical path when a photographing operation is to be carried out. This necessitates moving the objective lens forwardly, hence forcing an increase in the distance between the rear flange of the objective lens and the image pickup device, thereby making the camera bulky as a whole. The latter arrangement is disadvantageous in that the distance between the focal plane shutter and the image pickup device is increased beyond what is a desirably allowable maximum, reducing the efficiency of the shutter and again increasing the distance between the rear flange of the objective lens and the image pickup device, thus still resulting in an overly bulky camera.

The term shutter efficiency will be explained with reference to FIGS. 1 and 2. The shutter efficiency $\eta$ is defined as:

$$\eta = T/t = w/[w + (f/D)S],$$

where S is the distance between the focal plane shutter 1 and the surface 2 of the image pickup element, T ($=w/v$) is an effective exposure time, t ($=[w+(f/D)S]/v$) is a total exposure time, w is the slit width of the focal plane shutter, v is the running speed of the focal plane shutter, D is the diameter of the diaphragm of the objective lens 11, and f is the focal length of the object lens 11.

SUMMARY OF THE INVENTION

Taking the above into consideration, it is an object of the present invention to provide an electronic camera employing an optical low-pass filter in which the above-discussed difficulties have been eliminated.

In accordance with this and other objects, the present invention provides an electronic camera in which an optical low-pass filter is disposed between the image reflecting mirror and the focal plane shutter. By placing the optical filter at this location, there is no interference with the movement of the image reflecting mirror. Moreover, there is no attendant increase in the distance between the focal plane shutter and the image pickup device. Hence, a camera constructed in accordance with the present invention can be made compact and the shutter efficiency improved over prior art approaches.

DESCRIPTION OF THE PREFERRED EMBODIMENTS

Figure 1:
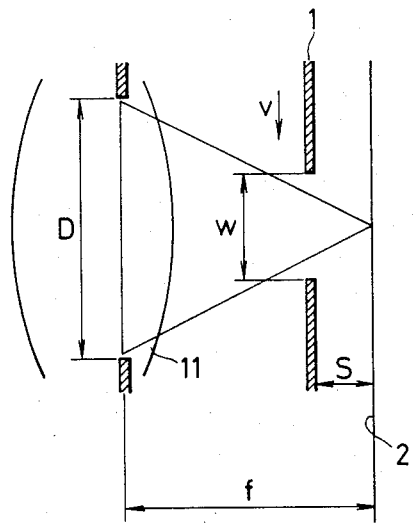
FIGS. 1 and 2 are, respectively, a side view and a graph used for explaining shutter efficiency.
Figure 2:
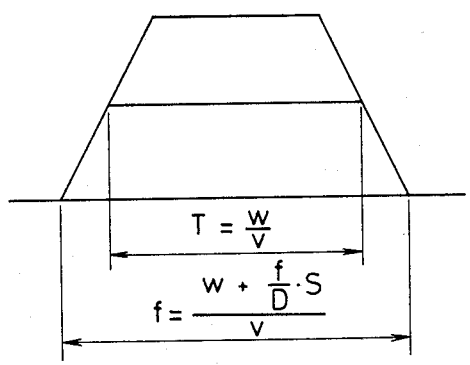
Figure 3:
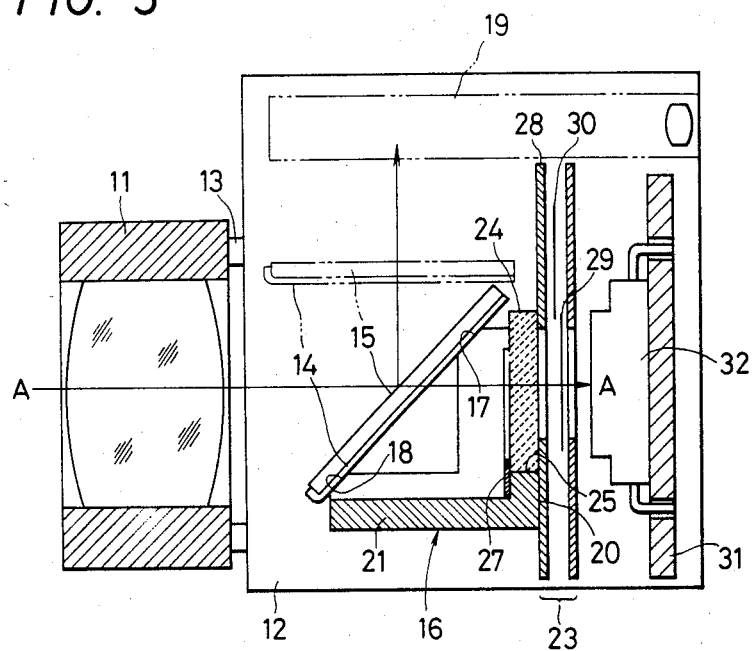
FIG. 3 is a schematic cross-sectional view of a preferred embodiment of an electronic camera of the invention.
Figure 4:
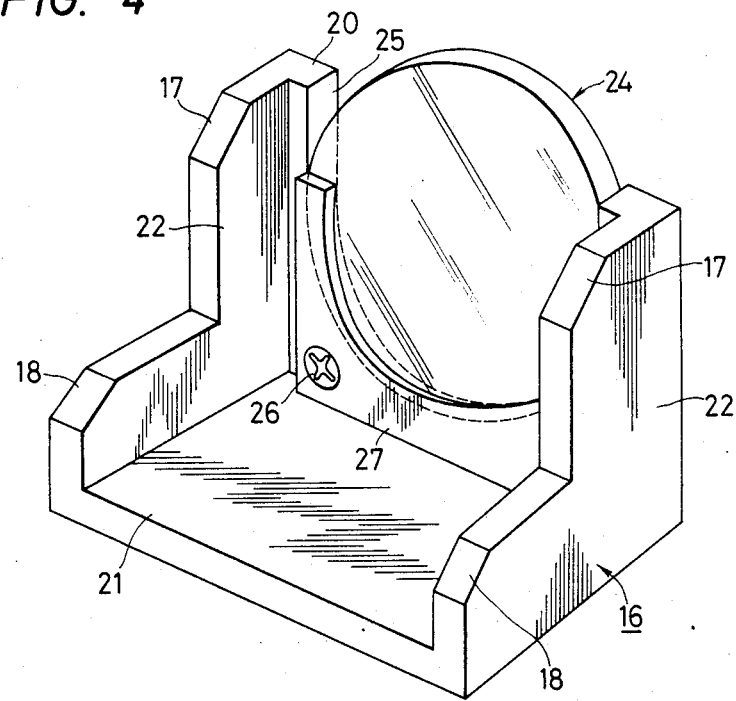
FIG. 4 is a perspective view showing an optical low-pass filter and a support therefor constructed in accordance with the invention.

Referring now to FIGS. 3 and 4, a preferred embodiment of the present invention will now be explained in detail.

An objective lens 11 is mounted on a camera body 12 through a lens mount 13. Within the camera body 12, a mirror support 14 is swingably mounted on a shaft (not shown) so that an image reflecting mirror 15 affixed to the support 14 can be swung out of the optical path when an exposure operation is to be performed. The support 14, and hence the mirror 15, are supported by surfaces 17 and 18 of a frame 16 in such a manner that, when the mirror is in its lowered position (as shown by solid lines in FIG. 3), the plane of the mirror from substantially a 45° angle with the optical axis A—A of the objective lens 11. In this position, the image bearing optical signal from the objective lens 11 is reflected by the mirror 15 to a viewfinder device 19. To perform an exposure operation, the support 14 and the mirror 15 are swung upwardly to the position shown in phantom in FIG. 3 so that the image bearing light signal passing through the objective lens 11 can fall upon the surface of a solid-state image pickup device 32.

The mechanism used for retracting the mirror 15 and support 14 from the optical path is well known, and hence a detailed description thereof will be omitted.

As shown best in FIG. 4, the frame 16 includes a filter holding portion 20 for maintaining the optical low-pass filter 24 perpendicular to the optical axis, a base portion 21 extending forwardly of the filter 24 from the lower side of the base portion 21 parallel to the optical axis, and side surface portions 22 on opposite sides of the base portion 21 and a filter holding portion 20. The upper and lower supporting surfaces 17 and 18 are formed on the side surface portions 22 in planes oriented 45° with respect to the optical axis. The frame 16 is mounted so that the filtering holding portion 20 positions the filter 24 just in front of the focal plane shutter 23 and just behind the image reflecting mirror 15.

The optical filter 24 is fitted into a U-shaped notch formed at the upper portion of the filter holding portion 20. A holding plate 27, attached with screws 26 and disposed at the lower end of the filter holding portion 20, retains the filter 24 to the frame 16. If desired, the holding plate 27 can be made integral with the body of the frame 16.

The focal plane shutter 23 is itself of a well-known construction, including a base plate 28 and front and rear curtains 29 and 30, respectively. The solidstate image pickup device 32 is supported on a circuit board 31.

In the electronic camera so constructed, when the image reflecting mirror 15 is in the down position indicated by solid lines in FIG. 3, the image bearing light signal from the objective lens 11 is reflected to the viewfinder device 19. When the mirror 15 is retracted out of the optical path upon depression of the shutter release button and moved to the position indicated in phantom in FIG. 3, the image bearing light signal passes from the objective lens 11 through the optical low-pass filter and is then applied to the image pickup device 32 in a controlled manner by the focal plane shutter 23. Specifically, the width of the focal plane shutter 23 is controlled in accordance with the brightness of the image being photographed so that a proper exposure level is maintained at all times. The optical low-pass filter eliminates from the optical signal the unwanted high spatial frequency components so that a moire-free output image is obtained.

Because, according to the invention, the optical low-pass filter is positioned between the image reflecting mirror and the focal plane shutter, there is no increase in the distance between the rear flange of the objective lens and the surface of the image pickup device. Moreover, there is no interference with the movement of the mirror between its two positions. Accordingly, the electronic camera of the invention can be made smaller in size than a conventional electronic camera.

Another advantage is that an optimum shutter efficiency is obtained because the distance between the focal plane shutter and the surface of the image pickup device is not restricted by the thickness of the optical low-pass filter.

Further, by providing the holding plate 27 as described above, it is easy to change the optical low-pass filter simply by removing the objective lens from its mount and removing the screws 26. Also, the one-piece construction of the frame 16 is advantageous in that the number of parts is minimized.

This completes the description of the preferred embodiments of the present invention. Although preferred embodiments have been described, it is believed that numerous modifications and alterations thereto would be evident to one of ordinary skill in the art without departing from the spirit and scope of the present invention.

We claim:

1. In an electronic camera of a type having, in order, an objective lens, a retractable image reflecting mirror, a focal plane shutter, and an electronic image pickup device, and an optical low-pass filter disposed in an optical path between said objective lens and said image pickup device, the improvement comprising:

means for positioning said optical low-pass filter between said mirror and said optical plane shutter;

said positioning means comprising a supporting frame which comprises a detachable holding plate for securing said optical low-pass filter to said frame, a base portion extending parallel to an optical axis of said objective lens, a filter holding portion adapted to receive said low-pass filter extending upwardly from a rear end of said base portion and to which said holding plate is secured, and first and second side portions disposed on opposite sides of said base portion and said filter holding portion and extending perpendicular thereto, said side surface portions having at least a pair of surfaces for supporting said retractable mirror at an angle of substantially 45 degrees in a lowered position of said mirror.

2. The electronic camera of claim 1, wherein said holding plate is disposed on a side of said frame towards said objective lens.

* * * * *